(12) United States Patent
Hoffmann et al.

(10) Patent No.: US 6,678,439 B2
(45) Date of Patent: Jan. 13, 2004

(54) WAVELENGTH DIVISION MULTIPLEXING AND BROADCAST OPTICAL INTERCONNECTION APPARATUS

(76) Inventors: Martin Hoffmann, 20 Hawley Rd., Shelton, CT (US) 06484; William Telesco, 148 Babbling Brook, Torrington, CT (US) 06790

(*) Notice: Subject to any disclaimer, the term of this patent is extended or adjusted under 35 U.S.C. 154(b) by 252 days.

(21) Appl. No.: 09/881,347

(22) Filed: Jun. 14, 2001

(65) Prior Publication Data

US 2002/0191900 A1 Dec. 19, 2002

(51) Int. Cl.[7] ................................. G02B 6/28
(52) U.S. Cl. .................. 385/24; 385/39; 385/47
(58) Field of Search ................ 385/24, 31, 39, 385/47, 49, 129

(56) References Cited

U.S. PATENT DOCUMENTS 5,351,317 A * 9/1994 Weber .......................... 385/3
6,198,857 B1 * 3/2001 Grasis et al. ................. 385/24
6,496,623 B2 * 12/2002 Asakura et al. .............. 385/47

* cited by examiner

Primary Examiner—Hemang Sanghavi
Assistant Examiner—Sung Pak

(57) ABSTRACT

The present invention relates to backplane interconnects for electronic systems, particularly for communications systems, wherein the interconnection capability of the backplane provides for high bandwidth, wavelength division multiplexing. The present invention also provides a means for broadcast transmissions using a single wavelength and parallel bus extension using a plurality of wavelengths. The present invention also provides a means for providing either high bandwidth, wavelength division multiplexing or broadcast transmissions using a single wavelength or parallel bus extension using a plurality of wavelengths either within a given system or between two systems using fiber optic cable or periscope-like mechanisms.

13 Claims, 12 Drawing Sheets

WAVELENGTH (nm)

InGaAs DETECTOR

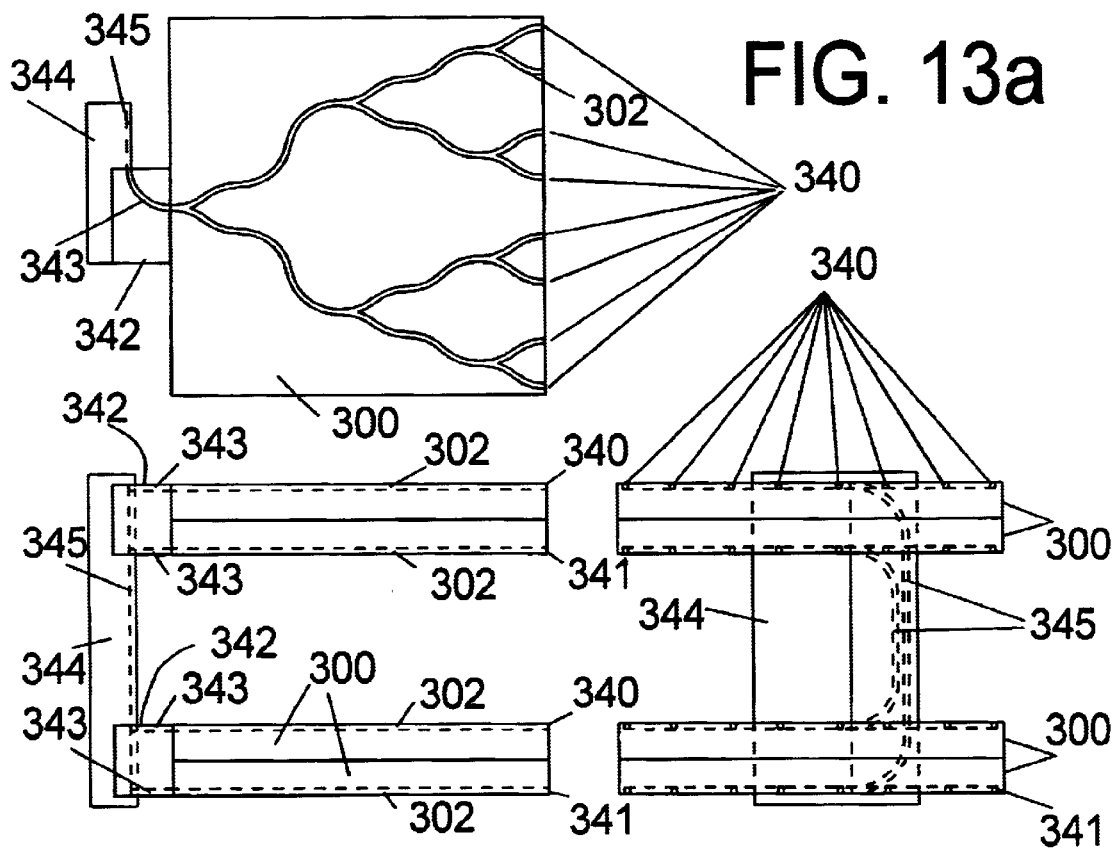

WAVELENGTH DIVISION MULTIPLEXING AND BROADCAST OPTICAL INTERCONNECTION APPARATUS

BACKGROUND OF THE INVENTION

The present invention relates to optical interconnects for electronic systems wherein the interconnection capability provides for high bandwidth, wavelength division multiplexing and a capability to perform broadcast or multicast transmissions between related circuit board assemblies.

Electronic systems engineers, especially those involved in the development of scalable high bandwidth systems, often provide backplanes and/or midplanes in order to interconnect the circuit assemblies so that information may be switched or shared between the constituent members of the system. Backplanes are an ordinary means of providing such interconnection and midplanes are a special case wherein circuit board assemblies may be connected to both sides of what would otherwise be called a backplane. These terms are used interchangeably herein. However, ordinary electrical backplanes generally do not provide an apparatus suitable for optical transmissions. Further, electrical backplanes generally do not provide a means to multiplex a plurality of optical signals into a single optical signal stream. In addition, a backplane is viewed as a means to communicate information between separate assemblies. The present invention provides a means to connect elements of two different systems as though they shared a common backplane. The present invention also provides a means to facilitate broadcast transmissions among circuit board assemblies within a given system. The present invention also provides a means to facilitate multicast transmissions among circuit board assemblies within a given system wherein a subset of the members of a system may be selected to receive a transmission simultaneously.

In our copending patent application Ser. No. 09/771797 filed Jan. 29, 2001 another optical interconnect apparatus is disclosed. It is envisioned that the invention set forth herein can be used in conjunction with the invention disclosed in the copending application to provide a more complete optical interconnect means.

SUMMARY OF THE INVENTION

The present invention comprises a generally planar optical splitter and combiner arrangement with a plurality of optical inputs and a plurality of optical outputs. Optical transmitters are arranged to inject optical signals into the combiner and optical receivers are arranged to detect optical signals emanating from the splitter. The transmitters and receivers can be designed to operate at a plurality of different wavelengths to permit wavelength division multiplexing (WDM), or they can be designed to operate at the same wavelength to permit broadcast transmission or they can be designed to operate as logical subsets of wavelengths to permit multicast transmissions.

In a preferred embodiment, an apparatus according to the invention has a plurality of double-sided plates with multiple optical waveguides converging into a central position on each side of the plates. At the central positions are multiple angled reflectors that serve to combine and split the signals from the multiple waveguides into a single optical signal and from a single optical signal to multiple waveguides.

In accordance with the preferred embodiment, each waveguide on a transmitter side of a given plate carries an optical signal that is spectrally separated from the signals on the other waveguides on the same side of the plate. In this manner, a plurality of spectrally isolated optical signals from a plurality of transmitters can be mixed and directed toward a common receiver plate.

Also in accordance with the invention, each waveguide on the other side of the plate is delivered an equal fraction of the multi-spectral signal incident on its central position.

Further, two or more such double-sided plates are connected together by means of fiber-optic cable or by a periscope-like mechanism to extend the communications facilities from one system to others.

Further, two such plates can be connected together directly to facilitate broadcast transmissions at a single wavelength or at multiple wavelengths within a system.

In alternate embodiments, the splitter and combiner functions are implemented differently but serve to illustrate the scope of the present invention.

OBJECTS OF THE INVENTION

It is an object of the invention to provide a means of optically multiplexing and demultiplexing a plurality of spectrally isolated optical signals.

It is an object of the invention to provide wavelength division multiplexing for an easily scalable number of channels from an easily scalable number of circuit board assemblies.

It is an object of the invention to provide wavelength division multiplexing from one system to another system.

It is an object of the invention to provide wavelength division multiplexing within a single system.

It is an object of the invention to provide a broadcast optical medium on which multiple circuit board assemblies can communicate.

Other and further objects of the invention will become apparent with an understanding of the following detailed description of the invention or upon employment of the invention in practice.

DESCRIPTION OF THE DRAWING

A preferred embodiment of the invention utilizing eight circuit board assemblies per system has been chosen for purposes of illustrating the construction and operation of the invention and is shown in the accompanying drawing in which:

FIG. 2b is a side elevation view of the plate of FIG. 2a.

FIG. 3A is a perspective view of the pyramidal mixing structure used in the wave division multiplexing plate.

FIG. 3B is a perspective view of the pyramidal dividing structure used in the wave division multiplexing plate.

FIG. 8b is a side elevation view of the plate of FIG. 8a.

FIG. 12b is an enlarged fragmentary plan view of a generally circular waveguide that could be employed in FIGS. 2a, 9, 10, 11 and 12a.

FIGS. 13a–c is an orthogonal view of two pairs of planar wavelength division multiplexing plates connected by a periscope mechanism.

DETAILED DESCRIPTION OF THE INVENTION

Figure 1:
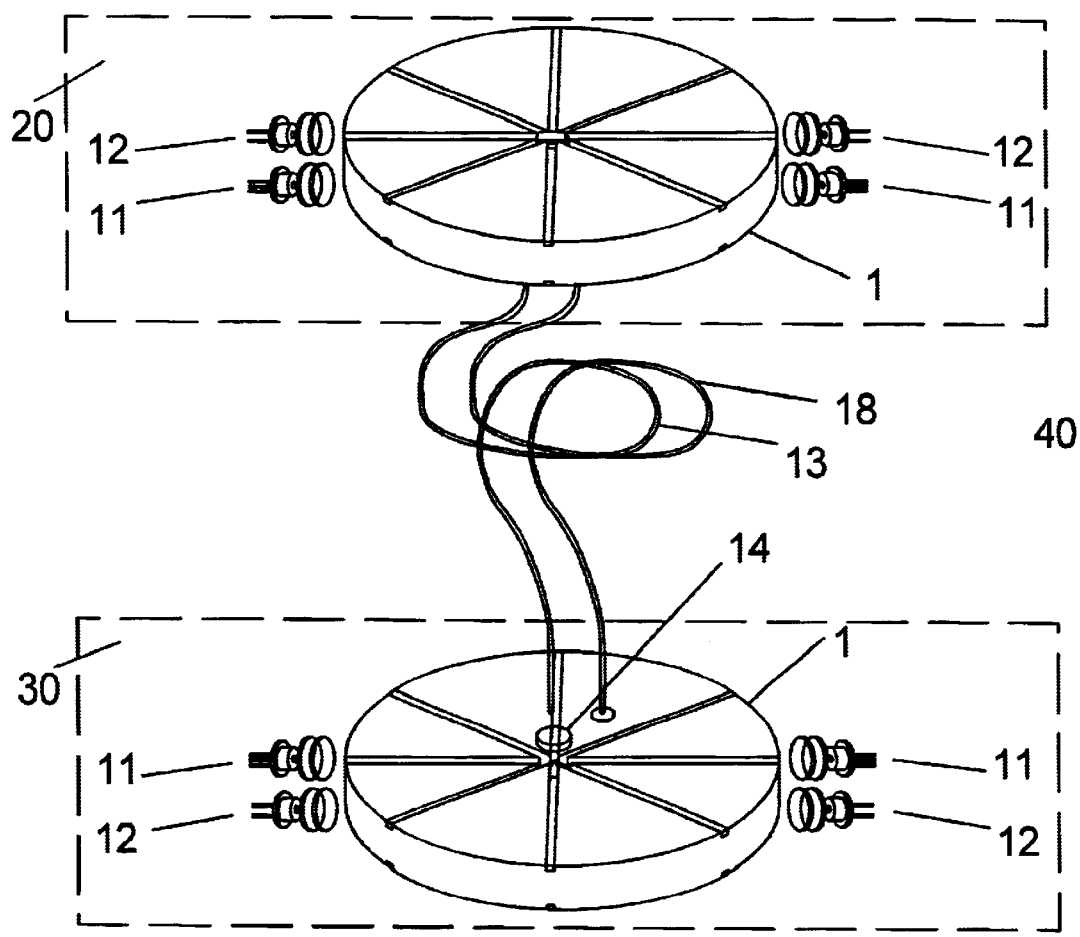
FIG. 1 is a perspective view of the preferred embodiment according to the invention.

Referring to FIG. 1 of the drawing, the wavelength division multiplexing (WDM) apparatus 40, by way of general assembly according to the invention, comprises an upper WDM assembly 20, a lower WDM assembly 30 and optical conduits in the form of a pair of fiber-optic cables 13 and 18.

Figure 2B:
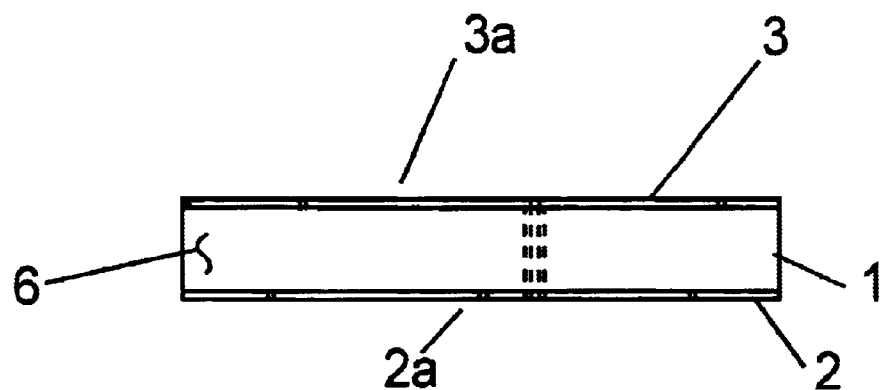
Figure 2A:
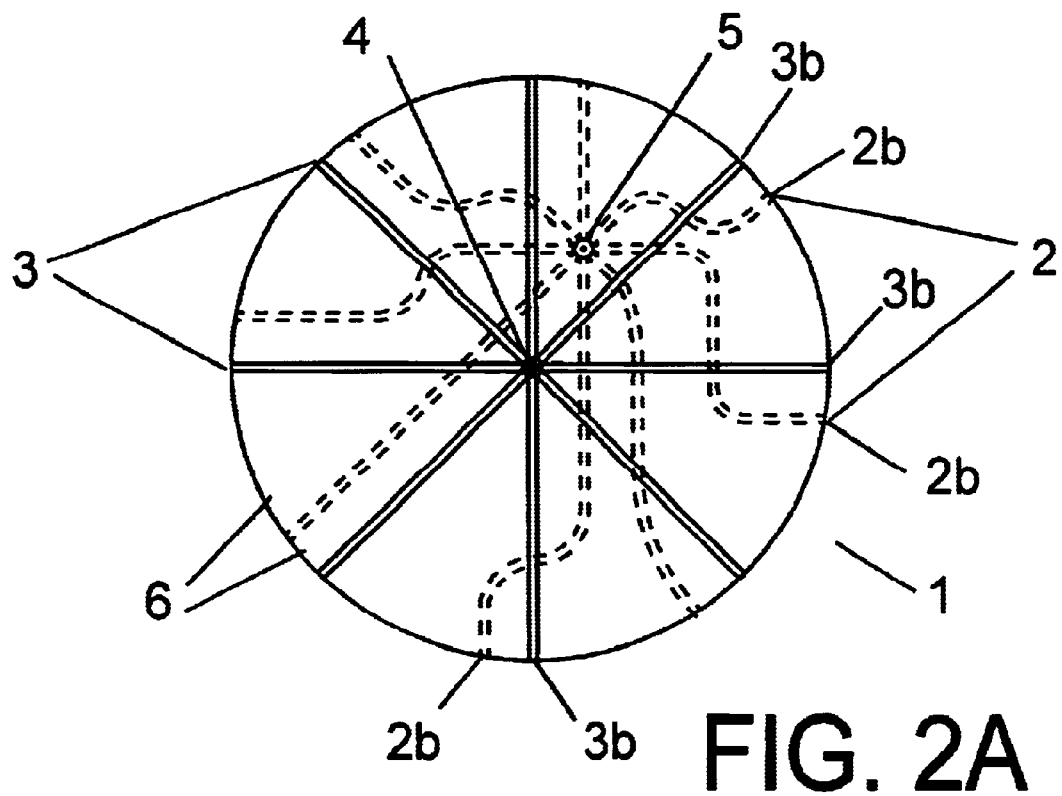
FIG. 2a is a plan view of the preferred embodiment of the planar wavelength division multiplexing plate according to the invention.

Referring to FIGS. 2a–b, a more detailed plan view of the wave division multiplexing plate 1 by way of general assembly according to the invention comprises a plurality of transmit waveguides 3, a plurality of receiver waveguides 2 (dash lines), an optically opaque substrate 6 of lower index of refraction than the waveguides, a transmitter exit aperture 4 and a receiver entrance aperture 5.

The transmit waveguides 3 are fabricated on the generally upper surface 3a of the substrate 6 and the receiver waveguides 2 are fabricated on the generally lower surface 2a of the substrate 6. The transmitter exit aperture 4 is located generally in the center of the wave division multiplexing plate 1 and the receiver entrance aperture 5 is located in a position offset from the transmitter exit aperture 4. The receiver and transmit waveguides, 2 and 3 respectively, are shown with their circumferential apertures 2b and 3b offset from each other to enhance understanding of the preferred embodiment of the present invention. In practice, it may be beneficial to construct apertures 2b, 3b along the same bisect or diameter of the disc circle.

Laser transmitters 11 and detector diode receivers 12 (FIG. 1) are arranged around the circumference of the wave division multiplexing plate 1 in optical registry respectively with each transmit 3b and receive 2b aperture. Each laser transmits a narrow-band optical signal into a transmit waveguide of the upper WDM assembly 20 and the lower WDM assembly 30. The laser diode transmitters and detector diode receivers are components of circuit board assemblies (not shown).

Referring still to FIG. 1, two WDM assemblies 20 and 30 are optically connected by a pair of fiber-optic cables 13 and 18. A plurality of narrow-band optical signals by laser transmitters 11 are transmitted into each of the two wave division multiplexing plates 1. Referring to the lower WDM assembly 30, the laser signals are propagated to the central positions of the wave division multiplexing plate 1 and reflected upward through an exit aperture and into a focusing lens 14 that causes the optical signals to become incident on the entrance aperture of the fiber-optic cable 13. Fiber-optic cable 13 carries the optical signals to the upper WDM assembly 20 where the optical signals become incident on an entrance aperture that is slightly offset from the upper plate's exit aperture. Fiber optic cable 13 provides for the generally even distribution of the signals across its cross-section prior to incidence on the entrance aperture of the upper WDM assembly. The offset is shown in more detail in FIG. 2 as the distance between apertures 4 and 5. Optical signals entering the entrance aperture become divided equally among all receive waveguides and each fractional signal becomes incident on the detector diode receivers 12.

Those skilled in the art will recognize that a supporting frame for circuit board assemblies may easily be constructed about a given WDM assembly.

Those skilled in the art will recognize that it is beneficial to minimize the number of sharp angles that the optical signals must traverse to minimize losses by transmission through the walls of the waveguides. Those skilled in the art will recognize that by proper material selection for the waveguides and the surrounding material, it is possible to confine the optical signals by means of total internal reflection.

Those skilled in the art will also recognize that the wave division multiplexing plate 1 can be constructed in several different ways. Microlithographic techniques, injection molding and machining are all potential methods for fabrication of the wave division multiplexing plate 1.

Figure 3:
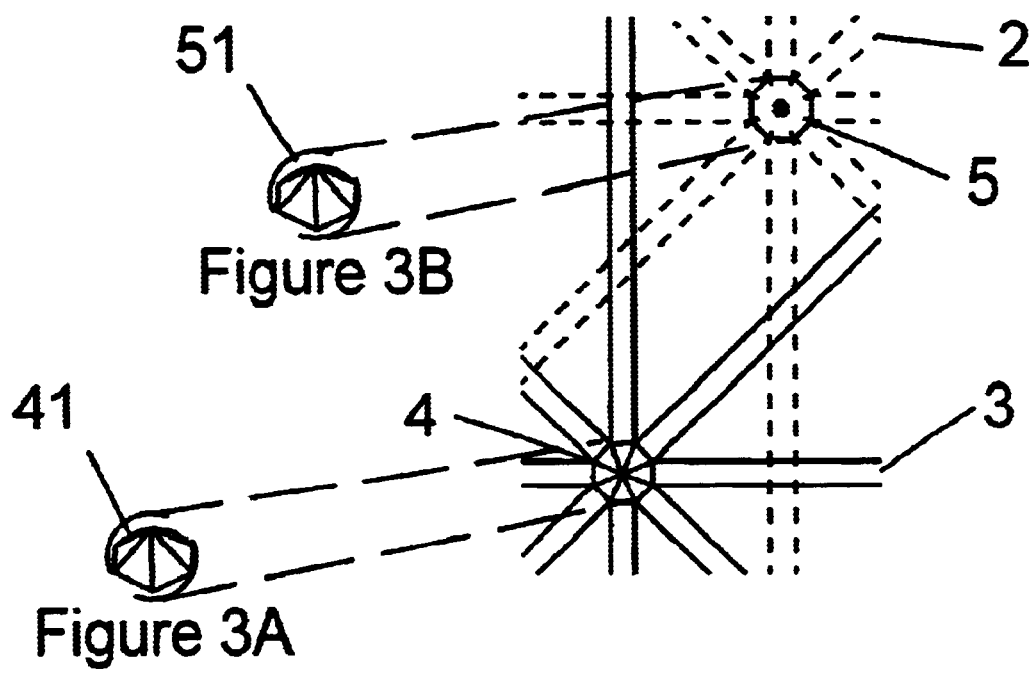
FIG. 3 is an enlarged plan view of the preferred embodiment of the wavelength division multiplexing plate according to the invention.

Referring to FIG. 3, an enlarged view of the transmitter exit aperture 4 and the receiver entrance aperture 5 illustrates the method by which the plurality of optical signals are mixed and divided according to the invention. Further, FIG. 3A is a perspective view of the pyramidal structure 41 having a plurality of facets, that is, one facet for each waveguide, used to mix the signals from the plurality of transmitters and direct them toward the exit aperture 4 of the wave division multiplexing plate 1. An identical structure 51 is used to divide the signal incident on the entrance aperture 5 of the wave division multiplexing plate 1 into a plurality of individual signals directed toward diode receivers 12 (FIG. 1). As a planar wavefront from a laser transmitter propagates down transmit waveguide 3, it ultimately arrives at a facet of pyramidal structure 41 whereupon it is reflected. In the plan view of FIG. 3, the direction of the reflected wavefront would be generally out of (i.e., normal to) the page as a result of the 45° angle between the facet and the waveguide. Those familiar with Snell's Law of refraction will recognize that if the waveguide is constructed with a high-index material such as polystyrene (n=1.59) and the waveguide boundary at the facet is air (n=1.00), the critical angle is 38.97°, permitting lossless reflection at 45°. Referring again to FIG. 1, the light is gathered up by lens 14 and focused onto the entrance aperture of fiber optic cable 13. As the wavefront is focused and caused to propagate along the length of fiber optic cable 13, the wavefront tends to lose its planar quality and the light reflected by the multiple facets of pyramidal structure 41 becomes mixed into a somewhat uniform field by the time it exits the fiber optic cable 13 and is directed onto pyramidal structure 51. The mixing occurs by virtue of the multiple reflections of the signals from the walls of the fiber optic cable instigated by the initial focusing action of lens 14. The somewhat uniform field, upon reaching pyramidal structure 51 is split into equal parts by the multiple facets of pyramidal structure 51 whereupon the individual parts are reflected along the receive waveguides 2 toward the detector diode receivers 12.

Figure 4:
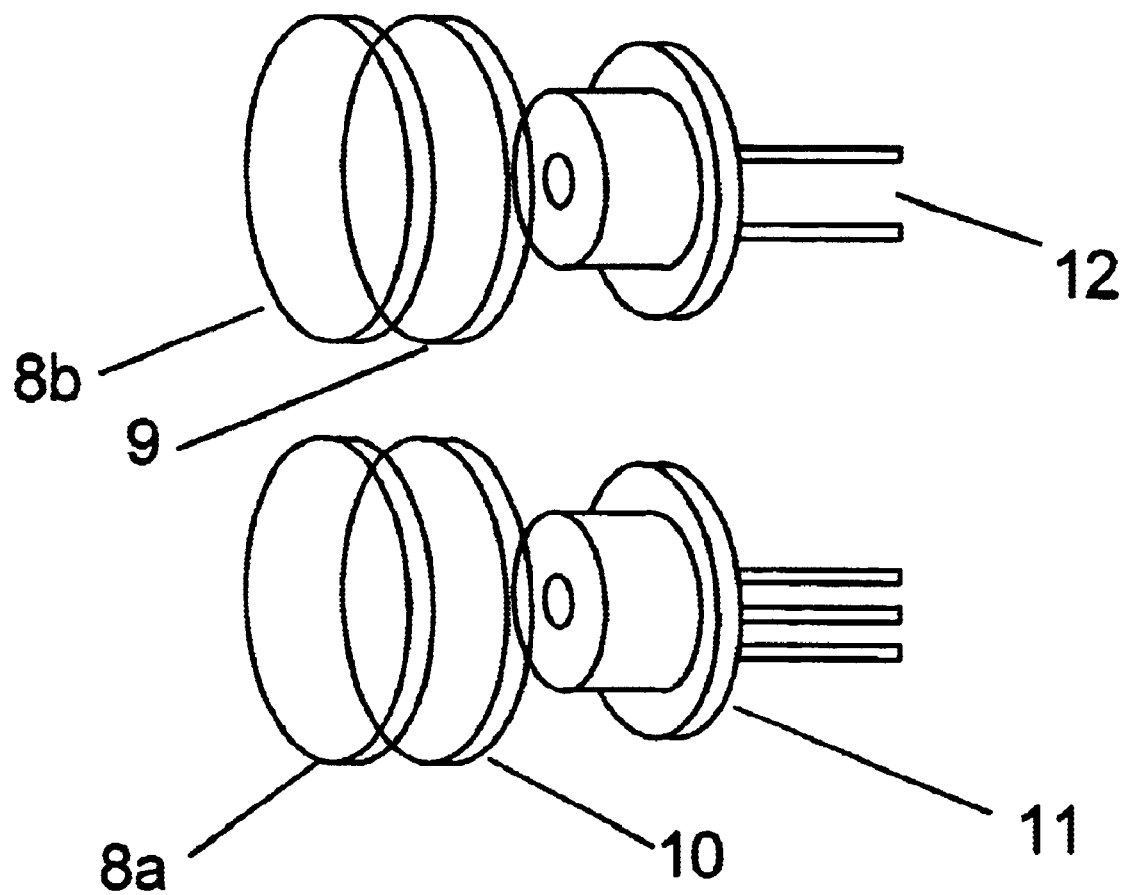
FIG. 4 is a perspective view of the electro-optic subsystem components used in conjunction with the wavelength division multiplexing plate according to the invention.

Referring to FIG. 4, a perspective view of the electro-optic subsystem components is illustrated according to the invention. A laser diode 11 emits light within a narrow spectral band and this light is gathered by a lens 10 to generate a generally planar wavefront. This wavefront is passed through a narrow band Fabry-Perot interference filter 8a. The signal leaving the interference filter 8a is, by way of general assembly according to the invention, caused to become normally incident on a transmit waveguide 3. This signal is propagated by the transmit waveguide 3 until it becomes incident on the waveguide mixing structure 41 and directed to the exit aperture 4 of the wave division multiplexing plate 1.

Those skilled in the art will recognize that the interference filter 8a used with the laser transmitter may be required to prevent the signals from the other transmitters from interfering with the biasing circuitry associated with the (edge emitting) laser diode 11. It is not needed to narrow the spectral content of the laser itself since laser diodes are inherently narrow-band devices. The filter 8a would not be required for some vertical cavity laser diodes.

Referring again to FIGS. 1 and 2, the mixed transmission signal leaving the exit aperture 4 may require a lens 14 to focus a substantial portion of the energy onto the entrance aperture of the fiber-optic cable 13. A lens 14 will not always be a requirement, depending on the aperture size of the fiber-optic cable, the fabrication method of the wave division multiplexing plate 1 and the length of cable used. Some cables have very small apertures in comparison to the cross-section of the exit aperture of the wave division multiplexing plate 1 especially if the wave division multiplexing plate 1 is fabricated by molding or machining processes. However, there are some large-diameter fiber-optic cables (>900 micron core diameters) that could be used without a focusing lens 14 even if the wave division multiplexing plate 1 waveguides are fabricated by molding or machining processes.

Referring again to FIG. 4, The fractional optical signal reflected toward detector diode receivers 12 is first incident upon another Fabry-Perot interference filter 8b. This filter is used to strip away all optical signals that are not of interest to the given detector diode receivers 12. The signal exiting the interference filter 8b becomes incident on a focusing lens 9 that focuses the optical signal of interest onto the active area of the detector diode 12.

Those skilled in the art will recognize that the focusing lens 9 may not be required in all instances depending on the length of the fiber-optic cable, the amplitude of the original transmitted signal, and the frequency and wavelength of the transmitted signal. Those skilled in the art will further recognize that the electro-optic subsystem components illustrated in FIG. 4 could simply be replaced by waveguide extensions onto a circuit board assembly to facilitate additional levels of optical interconnection or processing within the overall system.

Figure 5:
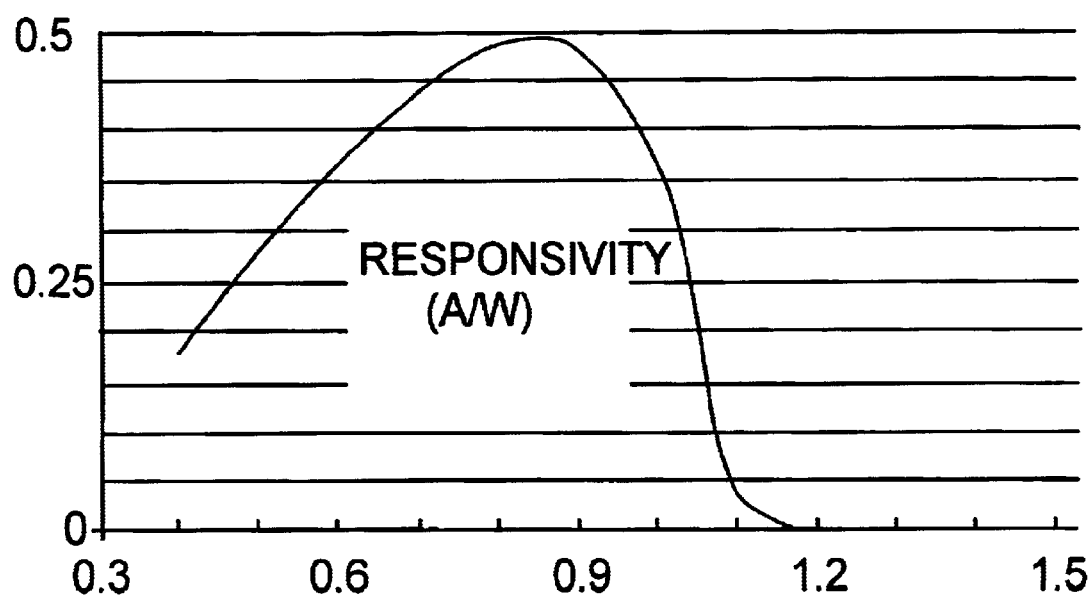
FIG. 5 is a graph showing the sensitivity of a typical silicon photodetector.
Figure 6:
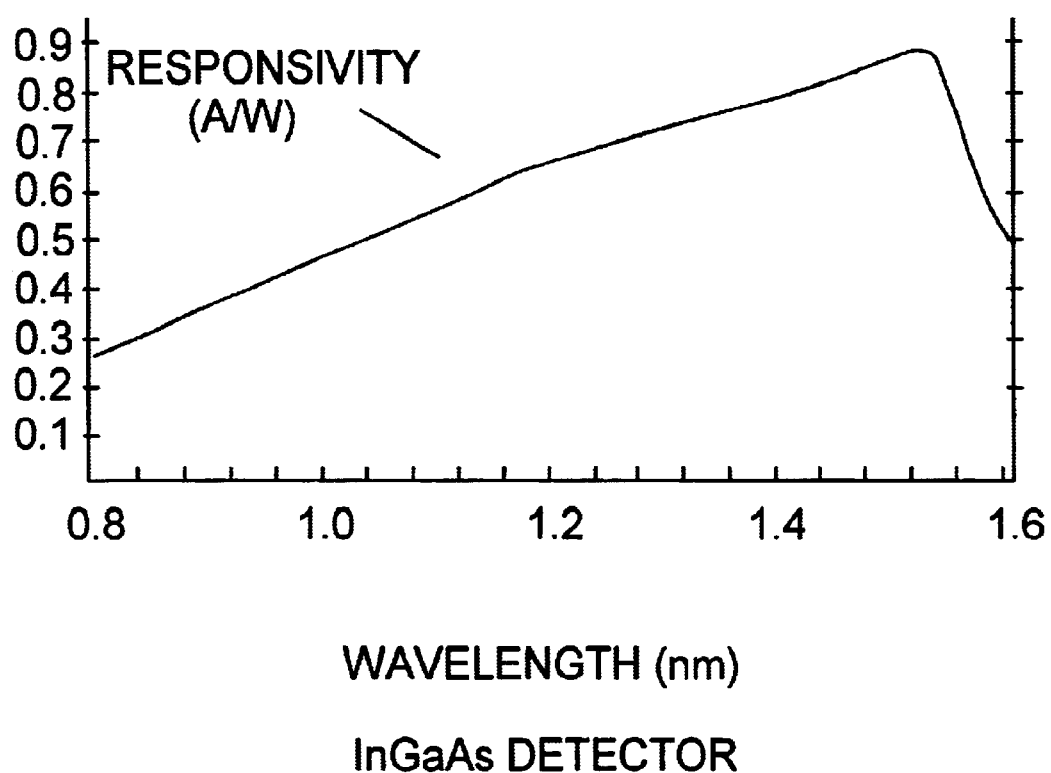
FIG. 6 is a graph showing the sensitivity of a typical InGaAs photodetector.

Referring to FIGS. 5 and 6, representative optical detector diode responsivities are shown for both silicon detectors and indium gallium arsenide detectors. Depending on the wavelengths chosen for a given application of the present invention, one of these detector types might be more advantageous. For example, at wavelengths greater than 1 micron silicon detectors are not very useful due to the low responsivities at those wavelengths. Just the opposite is true for indium gallium arsenide detectors.

Figure 7:
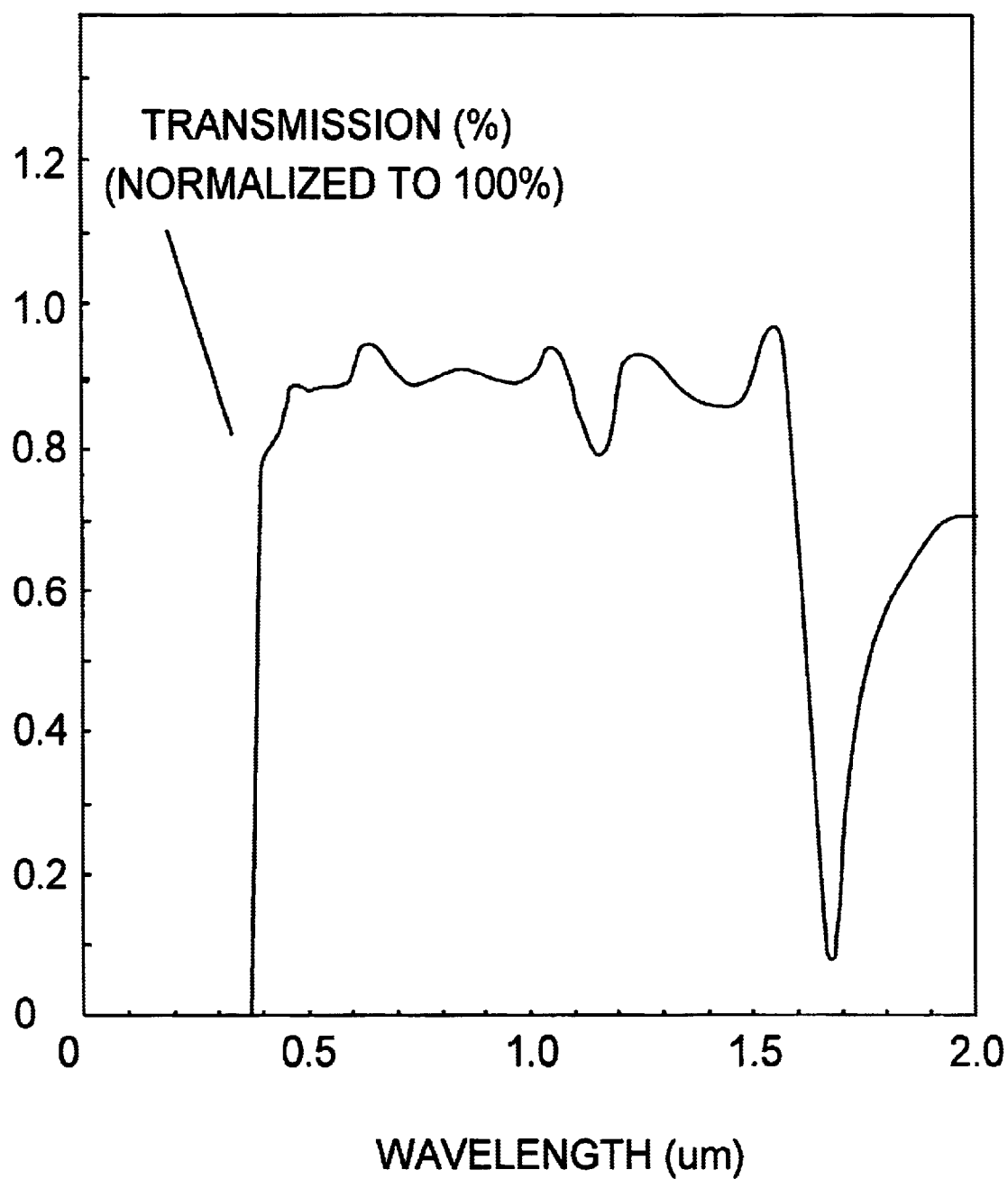
FIG. 7 is a graph showing the optical transmission characteristics of polystyrene plastic suitable for use with the wavelength division multiplexing plate according to the invention.

Referring to FIG. 7, the optical transmission characteristics of the common plastic polystyrene are shown. As the graph shows, this material is quite useful for the entire visible spectrum as well as a substantial portion of the near-infrared spectrum. This material would be useful if the wave division multiplexing plate 1 waveguides are fabricated by molding or machining processes. The index of refraction for this material is 1.590 at a wavelength of 589.3 nm, and is quite suitable over the short distances required by the present invention. Those skilled in the art will recognize that other optical-grade plastics such as PMMA would also be suitable for the present invention.

Figure 8B:
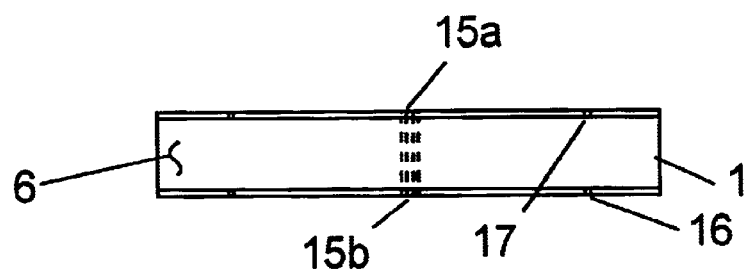
Figure 8A:
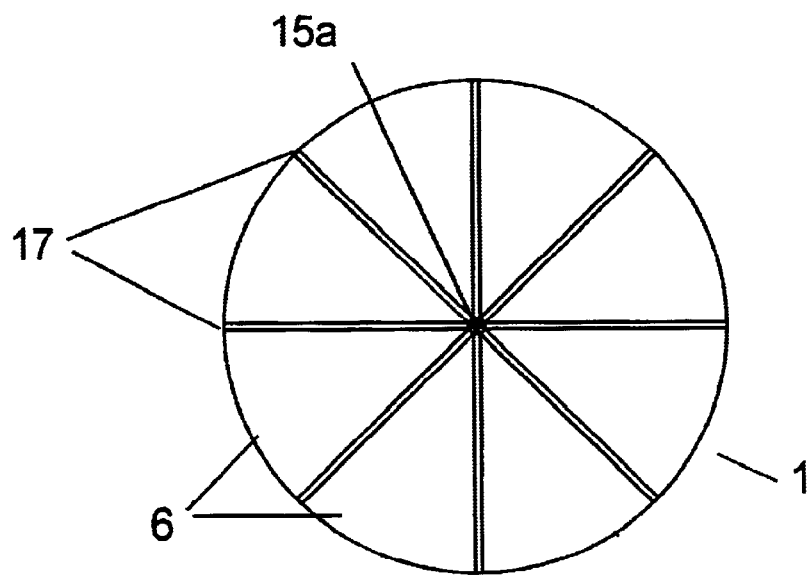
FIG. 8a is a plan view of an alternate construction of the wavelength division multiplexing plate.

A modified embodiment of the invention is shown in general assembly in FIGS. 8a–b wherein a wave division multiplexing plate 1 is constructed in which all multiplexing occurs within a single system by connecting the transmitter waveguide exit aperture 15a directly to the receiver waveguide entrance aperture 15b. The plate comprises an opaque substrate 6 with transmit waveguides 17 are fabricated on the generally upper surface of the substrate 6 and the receiver waveguides 16 are fabricated on the generally lower surface of the substrate 6. Transmitter exit aperture 15a and receiver entrance aperture 15b are each fitted with a pyramidal structure 41 (shown in FIGS. 3a–b) having a plurality of facets, one facet for each waveguide, by which the plurality of optical signals are mixed and divided according to the invention. As a planar wavefront from a laser transmitter propagates down transmit waveguide 17, it ultimately arrives at a facet of pyramidal structure 41 whereupon it is reflected. In this way, the plurality of transmit waveguides 17 is mixed and divided into a plurality of receive waveguides 16. To maximize the effectiveness of this construction, the lens 10 (FIG. 4) associated with laser diode 11 is either not used or is adjusted so as to cause the transmitted wavefront to be slightly un-focused. This action will tend to cause the general mixing action provided by the lens 14 and fiber optic cable 13 in the construction illustrated in FIG. 1. The substrate 6 remains opaque and with a lower index of refraction than the waveguides as before. This structure provides for broadcast capability within a single system while minimizing losses and uncontrolled reflections. This construction also allows for the possibility of broadcast transmissions using a single wavelength.

Figure 9:
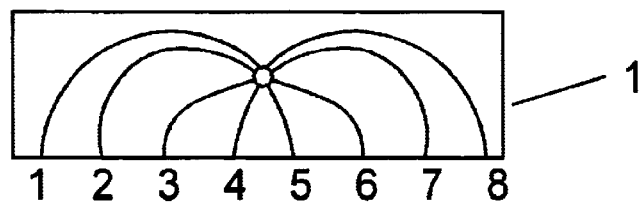
FIG. 9 is a schematic view of a rectilinear construction of the wavelength division multiplexing plate.

Another modified embodiment of the invention is illustrated in FIG. 9 in which the wave division multiplexing plate 1 is fabricated in a generally rectilinear shape more commonly recognized by those skilled in the art. This embodiment is equally useful in cases where the transmit and receiver apertures are arranged as illustrated in FIG. 2 or in cases where the transmit and receiver apertures are arranged as illustrated in FIG. 8. Those skilled in the art will recognize that this arrangement lends itself to midplane construction as easily as it does to backplane construction.

Figure 10:
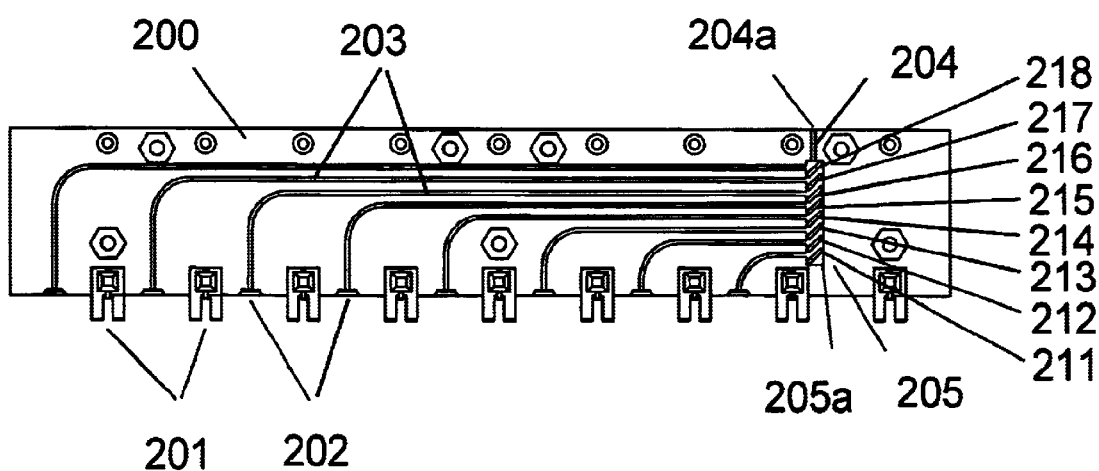
FIG. 10 is a plan view of an alternate construction of the wavelength division multiplexing plate utilizing a planar mixing apparatus.

Referring to FIG. 10, another alternate embodiment of the present invention is illustrated. The wave division multiplexing plate 200 is fabricated in a generally rectilinear shape and employs a modified signal mixing means 205. The wave division multiplexing plate 200 comprises cardguides 201 for receiving circuit boards (not shown), optical ports 202, input waveguides 203, an output waveguide 204 oriented normal to all the input waveguides with respect to the mixing means 205, and the optical signal wave mixing apparatus 205. As in the previous embodiments, the intention is to obtain an output wave comprising components of each of the input waves.

Accordingly, the wave mixing apparatus is constructed with a mirror 211 and a plurality of beamsplitters 212–218 mounted in a casing 205a with the mirror and beamsplitters set at such an angle to their respective waveguides as will direct their optical signals toward output wave guide 204 having aperture 204a.

It is an aspect of this modified embodiment of the invention to utilize beamsplitters 212–218 with specific reflectance-to-transmittance ratios so as to produce a signal on the output wave guide 204 consisting of one-eighth of the incident light from each of the input waveguides. To this end, mirror 211 reflects all of the incident planar light from its associated input waveguide 203 toward output waveguide 204. Beamsplitter 212 reflects one half all of the incident planar light from its associated input waveguide 203 toward output waveguide 204 and also transmits one half of the light reflected by mirror 211 toward output waveguide 204. Beamsplitter 213 reflects one third all of the incident planar light from its associated input waveguide 203 toward output waveguide 204 and also transmits two thirds of the light emanating from beamsplitter 212 toward output waveguide 204. The reflectance-to-transmittance ratios of the subsequent beamsplitters 214–218 decreases to one fourth/three fourths, one fifth/four fifths, one sixth/five sixths, one seventh/six sevenths and one eighth/seven eighths respectively. Those skilled in the art recognize that this arrangement leads to a signal on the output waveguide comprised of one eighth of the incident light from each of the input waveguides. Those skilled in the art will also recognize that system constructions similar to those illustrated in FIGS. 1, 8 and 9 can easily be realized with this embodiment of wave division multiplexing plate 200. In this way, the plate 200 comprises transmitting wave guides with output waveguide 204, or comprises receiving waveguides with optical input at waveguide aperture 204a.

Figure 11:
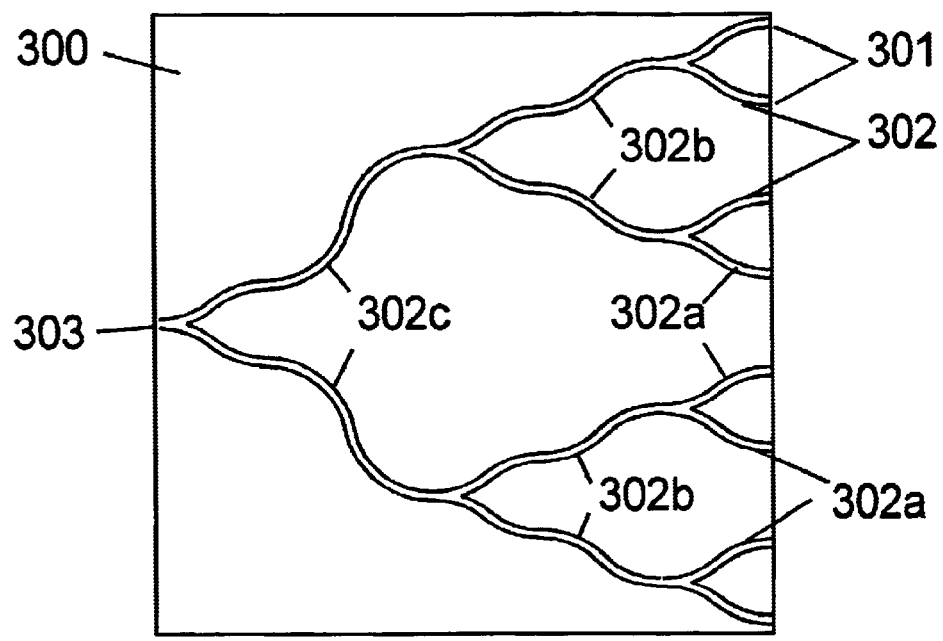
FIG. 11 is a plan view of an alternate construction of the wavelength division multiplexing plate utilizing a different planar mixing apparatus.

Referring to FIG. 11, another modified embodiment of wavelength division multiplexing plate according to the invention is illustrated. In this embodiment, the wave division multiplexing plate 300 is also fabricated in a generally rectilinear shape and employs a modified optical signal mixing means. The wave division multiplexing plate 300 comprises optical ports 301, input waveguides 302 and output waveguide 303. The wave mixing apparatus is constructed of converging pairs 302a, 302b, 302c of generally curved waveguides.

The curvature of the waveguides is selected so that total internal reflection is ensured. To do this, the indices of refraction of the waveguide and the surrounding material must be known. Then the critical angle below which an entering wavefront will always be reflected at the boundary of the two materials can be calculated using the well-known equation:

$$g_c = \sin^{-1}(n_2/n_1)$$

where:

$g_c$ is the angle between the direction of propagation of the input wavefront with respect to the normal to the boundary of the two materials, $n_2$ is the index of refraction of the material surrounding the waveguide, and $n_1$ is the index of refraction of the waveguide material.

For a typical boundary between a clear waveguide material like polystyrene ($n_1$=1.59) and air ($n_2$=1), the critical angle is 38.97°. If a low-index plastic such as polytetraflouroethylene ($n_2$=1.35) is used as the plate 300, then the critical angle is 58.1°. If we assume that the input wavefronts are collimated when they enter the optical ports 301, we must then determine the maximum radius of curvature of the waveguides 302 for a given waveguide cross-section. If we further assume a generally square cross-section of a given width, then the relationship between the radius and curvature can be derived from trigonometric relationships.

Figure 11A:
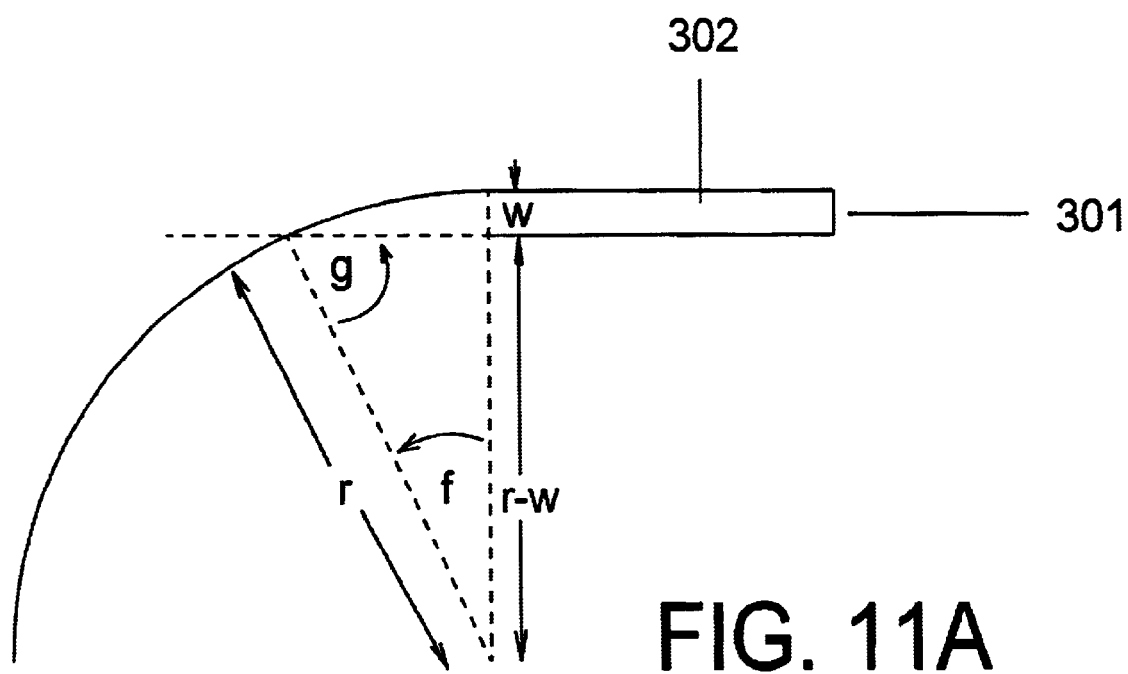
FIG. 11a is a fragmentary schematic view identifying factors used in selecting waveguide radius of the plate of FIG. 11.

Referring now to FIG. 11a, if the waveguide 302 has width w and a known critical angle g, the radius r can be determined as follows:

For a given $g$, $f=90-g$ $\cos f=(r-w)/r$ $r=w/(1-\cos f)$

As an example, if the materials are polystyrene and polytetraflouroethylene then the critical angle g equals 58.1°. If we also assume and the waveguide width w equals 0.040; by subtraction, f equals 31.9° and cos f equals 0.8489. Finally, r equals 0.265 inches. Or, in general for this specific selection of materials, the minimum radius of curvature of the waveguide is 6.62 times the width of the waveguide. This ensures that rays travelling along the inside edge of the waveguide will strike the opposite wall of the waveguide at an angle less than or equal to the critical angle, thus satisfying the requirements for total internal reflection.

Referring again to FIG. 11, it can also be shown that for planar waves propagating in the opposite direction, the wave at each of the n optical ports 301 will have a magnitude approximately equal to 1/n times the magnitude of the wave injected into waveguide 303. Thus, optical ports 301 can serve as input ports or as output ports. On inspection, a planar wavefront entering port 303 will be split into generally equal upper and lower parts at the first fork. If the radii are formed as described above, similar splits occur at each subsequent fork although the wavefront at subsequent forks is no longer planar. The loss of planarity occurs as a result of the reflections from the curved walls of the waveguides.

Figure 12A:
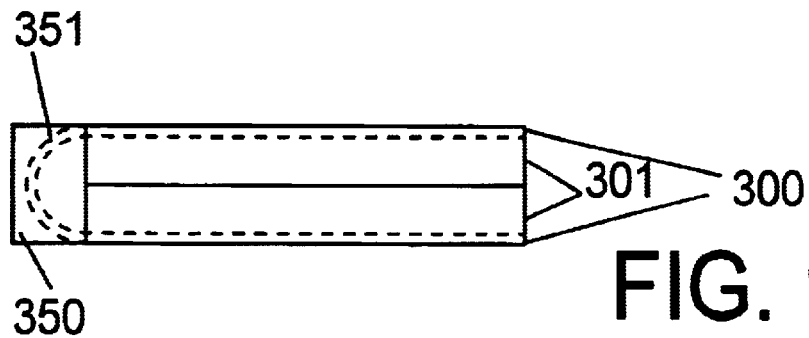
FIG. 12a is a plan view of an optical jumper arrangement for connecting planar wavelength division multiplexing plates together within a system.
Figure 12B:
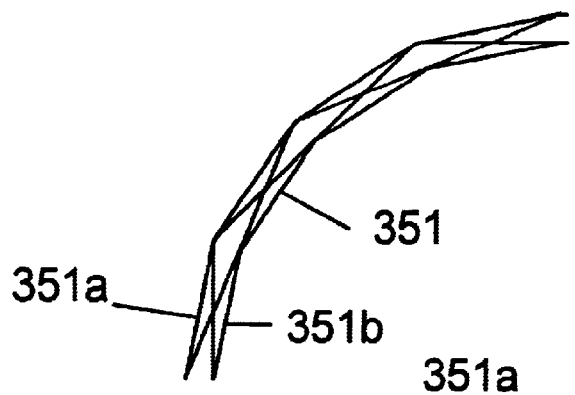

FIG. 12a illustrates an optical conduit in the form of a jumper arrangement for connecting two back-to-back wavelength division multiplexing plates 301 having waveguides 300. An optical jumper 350 is equipped with a planar waveguide 351 that is fastened to the transmit and receive planar wavelength division multiplexing plates 301 such that the optical jumper waveguide forms an optical connection between the generally upper and generally lower waveguides. This new optical jumper section of waveguide 351 is generally semi-circular in shape to minimize losses by ensuring total internal reflection within the waveguide. Referring to FIG. 12b, a generally circular waveguide 351 that maintains the planar nature of a wavefront is illustrated. This structure would be most useful when the indices of refraction of the materials used to form the waveguide and the opaque material do not permit simple 45 degree reflectors and some degree of curvature must instead be employed. Those skilled in the art will recognize that this ability will be beneficial in minimizing dispersion and loss throughout the optical interconnect, particularly with the embodiment illustrated in FIG. 10.

Figure 12C:
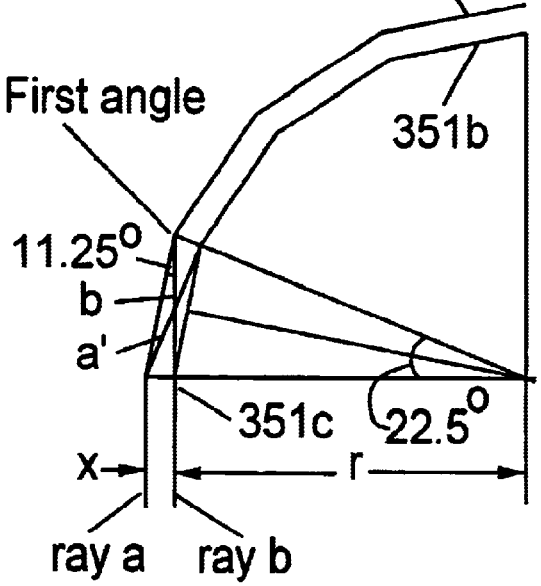
FIG. 12c is a view of the waveguide of FIG. 12c illustrating the relationship between the radius of the outer and inner margins of the waveguide.

The relationship between the radius of the outer hexadecagon 351a and the inner hexadecagon 351b that allows a wavefront to travel through it while maintaining its planar nature is derived by examining FIG. 12c. A ray a entering inlet aperture 351c from the lower left will immediately be reflected by the surface of the outer hexadecagon to become ray a'. Similarly, a ray entering from the lower right (ray b) must strike the surface of the outer hexadecagon before the first angle. These two rays are shown in FIG. 12c as a' and b. On inspection we see that the length of ray a' is equal to the length of ray b. We can subsequently determine the lengths of a' and b in terms of r and x:

$a' = (r+x)\sin 22.5$ $b = x/\sin 11.25$ since a=b, then:

$(r+x)\sin 22.5 = x/\sin 11.25$ $(r+x)/x = 1/(\sin 22.5 \sin 11.25)$

Therefore, if x is set equal to 0.040" as is the case for the standard waveguide in the present invention, then:

$(r+0.04)/0.04 = 1/(\sin 22.5 \sin 11.25)$ $r = 0.49676$, and $r/x = 12.394$

Those skilled in the art will also recognize that the embodiments illustrated in FIGS. 9, 10, 11 and 12 also lend themselves to solving the problem of parallel bus extension; a plurality of signals can be optically connected between two circuit board assemblies using a single pair of connections wherein each signal is transmitted as a separate wavelength. Additionally, multiple such plates could be used to provide additional bandwidth, redundant connections for fault tolerance, or to provide a plurality of connections operating at the same wavelength. These constructions also allow for the possibility of broadcast transmissions using a single wavelength similar to the embodiment illustrated in FIG. 8. They also provide for the construction of a shared bus structure.

Referring to FIG. 13a–c, an optical conduit in the form of a periscope arrangement for connecting two pairs of planar wavelength division multiplexing plates 300 is illustrated. FIG. 13 comprises three views of the periscope arrangement; FIG. 13a shows the periscope arrangement from the top, FIG. 13b shows the periscope arrangement from the left side and FIG. 13c shows the periscope arrangement from the front. This arrangement is very similar to the arrangement in FIG. 1 except that a rigid periscope mechanism with waveguides is employed instead of fiber optic cable although those skilled in the art will recognize that fiber optic cable could also be adapted to the task.

Referring to FIG. 13a, the periscope mechanism comprises a horizontal planar waveguide block 342 with curved waveguides 343 on both the top and bottom surfaces used in conjunction with a vertical planar waveguide block 344 with two generally parallel waveguides 345 on the same side. FIGS. 13b and 13c illustrate that in operation, an optical signal injected into port 341 would propagate down the equivalent waveguide 302 (FIG. 13b) until completing the traversal of the bottom-most planar wavelength division multiplexing plate 300. The signal continues propagation across the bottom-most horizontal planar waveguide block 342 via curved waveguide 343. Referring to FIG. 13c, the signal continues propagation up vertical planar waveguide block 344 via rightmost waveguide 345. Referring to FIG. 13a, the signal continues propagation across the top-most horizontal planar waveguide block 342 via curved waveguide 343. The signal then splits in a generally equal fashion to arrive simultaneously at all ports 340 on the topmost of planar wavelength division multiplexing plates 300.

Those skilled in the art will recognize that the periscope mechanism would have similar utility with the planar wavelength division multiplexing plates 200 and 300 shown in FIG. 10 and FIG. 11 respectively.

Various changes may be made to the structures embodying the principles of the invention. The foregoing embodiments are set forth in an illustrative and not in a limiting sense. The scope of the invention is defined by the claims appended hereto.

We claim:

1. A wavelength division multiplexing apparatus for a plurality of circuit board assemblies forming part of electronic systems comprising plates each having a plurality of transmission and reception waveguides, each waveguide for transmitting and receiving at different wavelengths, each such waveguide being optically isolated from each other such waveguide, the transmission and reception waveguides converging to define apertures, a pyramidal structure positioned at each aperture for mixing and dividing all such different wavelengths, and the apertures being directly connected to each other to perform wavelength division multiplexing within a given system.

2. A wavelength division multiplexing apparatus as defined in claim 1 utilizing generally circular waveguide plates.

3. A wavelength division multiplexing apparatus as defined in claim 1 utilizing a combination of generally circular waveguide plates and generally rectilinear waveguides plates.

4. A wavelength division multiplexing apparatus as defined in claim 1 utilizing generally rectilinear waveguide plates.

5. A wavelength division multiplexing apparatus as defined in claim 4 in which all transmissions are made at the same wavelength to perform broadcast communications within a given system.

6. A wavelength division multiplexing apparatus as defined in claim 4 in which all transmissions are made at different wavelengths between circuit board assemblies to facilitate parallel bus extension within a given system.

7. A wavelength division multiplexing apparatus as defined in claim 5 utilizing generally circular waveguide plates.

8. A wavelength division multiplexing apparatus as defined in claim 5 utilizing generally rectilinear waveguide plates.

9. A wavelength division multiplexing apparatus as defined in claim 5 utilizing a combination of generally circular waveguide plates and generally rectilinear waveguide plates.

10. A wavelength division multiplexing apparatus as defined in claim 7 in which all transmissions are made at the same wavelength to perform broadcast communications within a given system.

11. A wavelength division multiplexing apparatus as defined in claim 7 in which all transmissions are made at different wavelengths between circuit board assemblies to facilitate parallel bus extension within a given system.

12. A wavelength division multiplexing apparatus for a plurality of circuit board assemblies in electronic systems comprising a plurality of transmission and reception waveguides, each transmitting and receiving at a different wavelength, each such waveguide being optically isolated from each other such waveguide, a set of mirrors and beamsplitters for mixing and dividing all such wavelengths, the set of mirrors and beamsplitters having reflectance/transmittance ratios following a natural 1:1, 1:2, 1:3, 1:4, 1:n relationship thus providing for an output wave comprising generally equal portions of all n input waves, the transmission waveguides having an output waveguide with an output aperture, the reception waveguides having an input waveguide with an input aperture.

13. A wavelength division multiplexing apparatus as defined in claim 1 utilizing waveguide plates having generally circular sections of waveguide defined by an inner hexadecagon having a radius r and by an outer hexadecagon having a radius of r+x where x is the radial width of the waveguide, the waveguide having a curvature allowing a wavefront to transit the waveguide while maintaining a planar nature.

* * * * *